United States Patent [19]

Ritchie et al.

[11] Patent Number: 4,565,208
[45] Date of Patent: Jan. 21, 1986

[54] SEISMIC SHUT-OFF VALVE

[76] Inventors: David E. Ritchie, 6166 Palo Alto Dr., Anaheim Hills, Calif. 92807; Edward E. Seay, 881 Nordica, Anaheim, Calif. 92806

[21] Appl. No.: 607,156

[22] Filed: May 4, 1984

[51] Int. Cl.⁴ .............................................. F16K 17/36
[52] U.S. Cl. ..................................................... 137/38
[58] Field of Search .................................... 137/38, 39

[56] References Cited
U.S. PATENT DOCUMENTS
4,485,832 12/1984 Plemmons .............................. 137/38

Primary Examiner—Robert G. Nilson
Attorney, Agent, or Firm—Knobbe, Martens, Olson & Bear

[57] ABSTRACT

In a seismic actuated shut-off valve, a valve seat is placed between, and in communication with an inlet and outlet. A circular track is located above the valve seat and a plurality of balls ride in the track. A specifically shaped obstruction on the track causes a ball to leave the track at a predetermined seismic level, the ball falling onto the valve seat to shut off the gas flow through the valve. A reset rod can be extended through the valve seat in order to push the ball off of the valve seat and back onto the track in order to reopen the valve.

23 Claims, 8 Drawing Figures

SEISMIC SHUT-OFF VALVE

BACKGROUND OF THE INVENTION

This invention relates to an improved seismic actuated shut-off valve, and in particular to an improved gas shut-off valve.

Many residential and commercial buildings use gas for heating, cooking, and other purposes. Earthquakes commonly cause extensive building motion and rupture of the gas lines resulting in explosion and fires. In areas which are prone to seismic disturbances such as earthquakes, it is desirable to automatically shut off the gas when an earthquake occurs. This need has been recognized by several state legislatures, such as California, which have established standards for seismic actuated gas shut-off valves. It is an object of this invention to provide a seismic shut-off valve satisfies the requisite safety requirements, and provides a safe means of protecting building from gas leaks and explosions after an earthquake.

SUMMARY OF THE INVENTION

It is therefore an object of this invention to provide a seismic actuated shut-off valve particularly suited for shutting off the gas flow when a predetermined seismic force actuates the shut-off mechanism. The valve operates when a seismic force dislodges a ball which falls into a valve seat, in order to shut off gas flow through the valve.

To this end, the invention provides unique features to a ball-actuated gas shut-off valve. The valve housing has a gas inlet and outlet, between which is located a shut-off valve seat. A substantially horizontal, circular track is located above the valve seat. The track preferably consists of a groove in the housing, the groove having a rectangular cross-section. Three steel balls roll on the track, the diameter of the balls being larger than the width of the track so that the balls contact the track at two points on the spherical, ball surface. The balls are free to travel along the track.

An obstruction is placed on the track so that if a seismic oscillation causes one of the balls to strike the obstruction with sufficient energy, the ball will be deflected out of the track and into the shut-off valve seat. The ball cooperates with the valve seat to block the flow of gas through the valve seat to shut off the gas. The surface of the obstruction contacting the ball is preferably shaped to not only deflect the ball towards the valve seat, but also has a recess or indentation to inhibit the ball from leaving the track until a predetermined seismic force occurs.

A reset rod is used to remove the ball from the valve seat and return the ball to the track. The reset rod is located below the valve seat and is slidably mounted to extend up through the valve seat to the track. An O-ring on the reset rod prevents gas leakage. The end of the reset rod contacting the ball is inclined so that the ball rests between the rod end and the side of the housing as the rod pushes the ball up to the track. The ball then rolls off the inclined end of the reset rod and into the track so that the shut-off mechanism is again ready for use.

DESCRIPTION OF THE DRAWINGS

These and other features of the invention will now be described with reference to the drawings of the preferred embodiment which is intended to illustrate, but not to limit the invention, and in which.

DESCRIPTION OF THE PREFERRED EMBODIMENT

Figure 1:
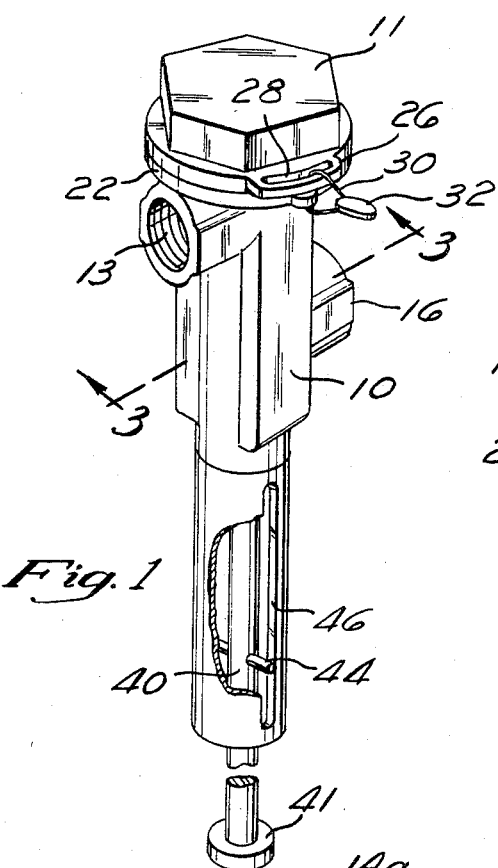
FIG. 1 is a perspective view of the exterior of the valve, partially cut away to show the reset rod.

FIG. 1 shows the external view of a valve housing 10 having a cap 11 on one end of the housing. The valve mechanism is located inside the cap 11 and housing 10. Below the cap is located a gas inlet 13 on one side of the housing. A gas outlet 16 is below and in communication with the inlet 13. Immediately adjacent the cap 11 on housing 10 is located flange 22 through which is a hole or aperture 24. A corresponding flange 26 containing a slot 28 is located on the cap 11. The slot 28 and hole 24 coincide or overlap. Thus, when the cap 11 is screwed onto the threads 20 of housing 10, the slot 28 overlaps the hole 24 so that a wire 30 can be passed through the slot 28 and the hole 22 in order to lock the cap 11 onto the housing 10. A lead seal 32 can be applied to the wire 30 in order to provide positive indication that the valve mechanism inside the cap 11 had not been disturbed after its installation.

Figure 2:
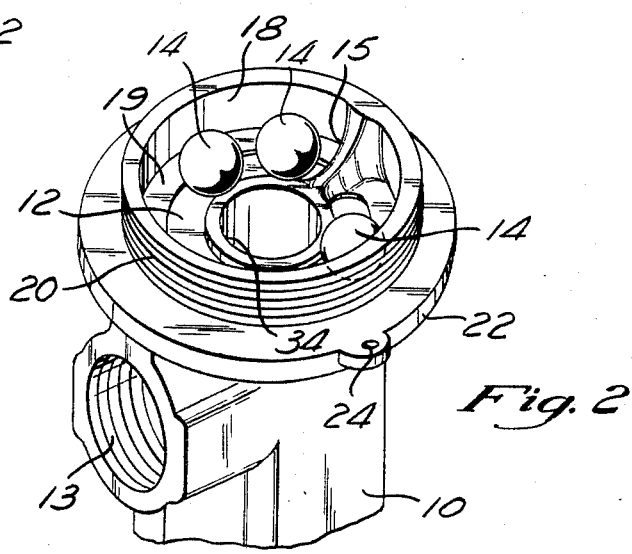
FIG. 2 is a perspective view of the balls, track, and obstruction in the valve housing.
Figure 3:
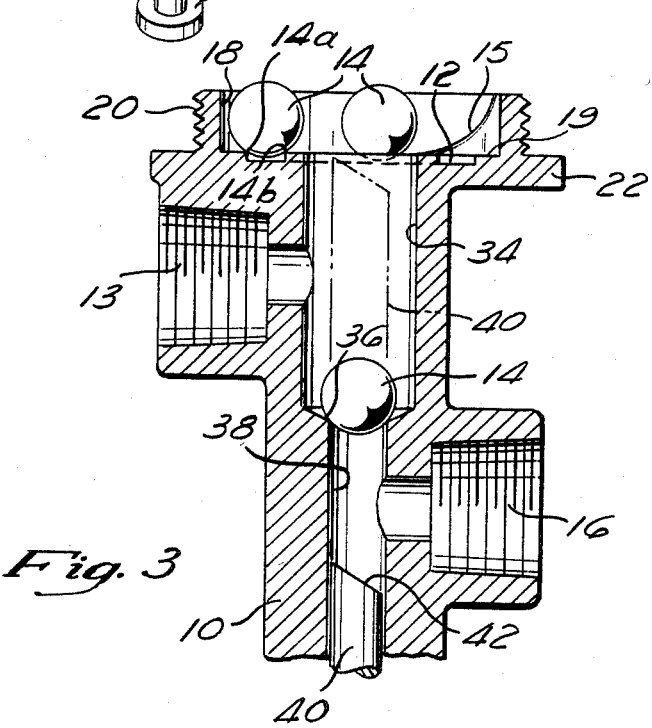
FIG. 3 is a partial cross-sectional view taken along 3—3 of FIG. 1.

With reference to FIGS. 2 and 3, the top portion of the housing 10 has an inner cylindrical recess or aperture enclosed by cylindrical side wall 18. The outside portion of the housing 10 adjacent the cylindrical side wall 18 contains threads 20 which mate with corresponding threads on cap 11 so that the cap can be screwed onto the housing thereby enclosing balls 14 within the housing 10. An O ring (not shown) seals the cap 11 on the housing 10 to prevent gas leakage.

At the bottom of the cylindrical side wall 18 is an annular shoulder or step 19 extending radially inward of the wall 18. A circular track 12 is located in the annular step. The steel balls 14 ride on the track 12. The track 12 has a rectangular cross-section so that the balls 14 contact the track 12 at two points 14A and 14B on the spherical surface of the ball 14. The track 12 is deep enough so that the ball 14 does not contact the bottom of the track. The track 12 is also located far enough from the cylindrical side wall 18 of housing 10 so that the ball 14 does not contact the side wall 18.

Referring to FIG. 3, there is an aperture preferably taking the form of a cylindrical hole 34 located concentric with the circular track 12. This hole 34 is in communication with the inlet 13 in housing 10. At the bottom of hole 34 is a valve seat 36 which preferably takes the form of a conical section which adjoins the cylindrical hole 34 to a smaller diameter aperture preferably having the shape of cylindrical hole 38. The hole 38 is coaxial with hole 34 and in communication with outlet 16. Thus, the valve seat 36 is intermediate or between the inlet 14 and the outlet 16. The diameter of the hole 38 at the valve seat 36 is smaller than the diameter of the balls 14. Thus, placing a ball 14 on the valve seat 36 can block the gas flow through the valve seat 36.

A severe earthquake could cause at least one ball 14 to jump out of the track 12 and block the valve seat 36. However, lesser severity vibrations do not directly dislodge the balls 14 from the track 12. An obstruction 15 blocks the free movement of balls 14 along the track 12 and urges the balls 14 out of the track 12 when a sufficiently severe earthquake is experienced. The obstruction 15 can take the form of projections or bosses attached to housing 10 or cap 11, but preferably takes the form of a vertical wall extending radially across circular track 12. The obstruction 15 abuts or joins the cylindrical wall 18 as well as the step 19. The obstruction 15 has a free edge taking the form of an inclined upper surface whose height decreases at a decreasing rate as in a curve or arc, from the top of the wall 18 toward the center of track 12 and hole 34.

Figure 4:
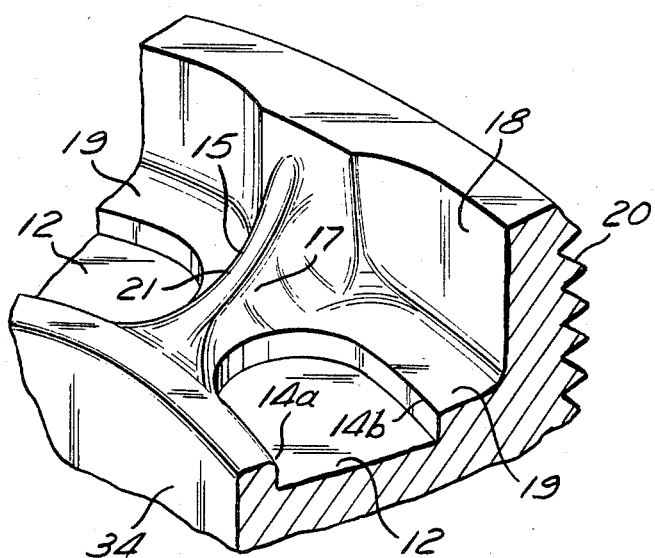
FIG. 4 is an enlarged, partial perspective view of the obstruction of this invention.
Figure 5:
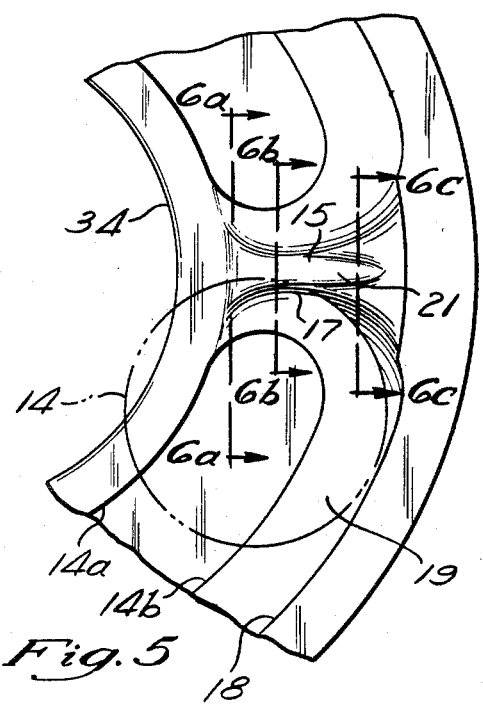
FIG. 5 is a top view of FIG. 4.
Figure 6A:
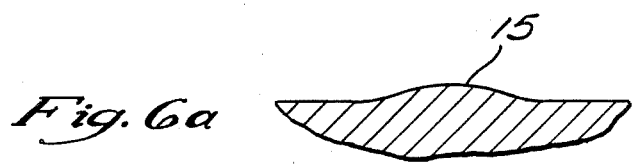
FIGS. 6a, 6b, 6c, are sectional views taken along 6—6 of FIG. 5.
Figure 6B:
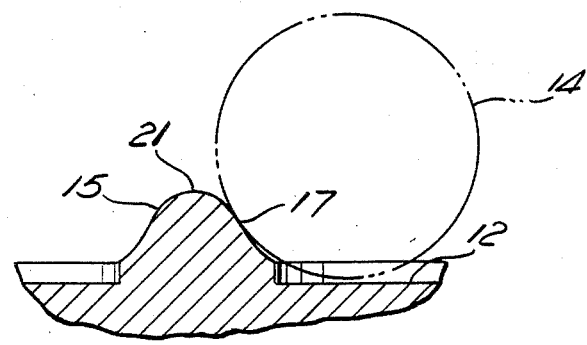
Figure 6C:
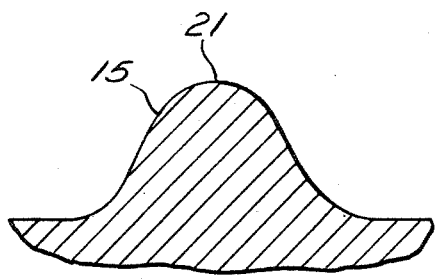

Referring to FIGS. 4–6, and especially FIGS. 6a–c, the obstruction 15 has a width, the exposed surface of which is rounded or humped to form rib portion 21 down the central, radial length of obstruction 15. The humped rib portion 21 recurves to flare out and blend into a less curved portion at the edges of obstruction 15 adjacent the stepped portion 19 and the cylindrical wall 34. Additionally, the radius of curvature of the hump or rib portion 21 is smaller or sharper at the central portion of obstruction 15 than it is toward the top of the housing 10, or adjacent the hole 34.

Alternately phrased, the obstruction 15 has a width which varies toward the upper surface containing rib 21, and also varies along the radial length of the obstruction 15. The circumferential width of obstruction 15 adjacent the step 19 generally increases toward the wall 18 and generally decreases toward the hole 34. The width of the obstruction 15 also generally decreases toward the upper surface of the obstruction 15 which forms the rib 21.

The track 12 ends such that the ribbed portion 21 of obstruction 15 contacts the balls 14 in a manner which can urge the balls 14 toward the hole 34. As illustrated in the preferred embodiment, track 12 extends part way into obstruction 15. The curvature of obstruction 15 primarily cups or contacts a portion of the balls 14 along an area below the center, and to the radially outward side of ball 15. Thus, if ball 14 contacts obstruction 15 with sufficient force, the ball 14 is urged or ramped up and out of track 14 and into hole 34.

As best seen in FIGS. 5 and 8, the recess portion 17 of the obstruction 15 in contact with the balls 14 is preferably recessed or indented so as to partially enclose a portion of the contacting ball 14. The shape of the obstruction 15, recess 17, and rib portion 21 is such that contact with the balls 14 will result in the balls being deflected toward the hole 34 when the valve is excited by a predetermined seismic force. The recess 17 accommodates a portion of a contacting ball 14 to inhibit the ball 14 from leaving track 12 when the seismic disturbance is below a predetermined level. The recess 17 is primarily formed by the increase in circumferential width of obstruction 15 adjacent the hole 34, such that the recess 17 can inhibit movement of the ball 14 toward the hole 34 at low seismic levels.

This invention has been tested by vibrating the housing 10 along each of four equally spaced axes in the plane of the track 12. The axes were spaced 45° apart. If one or two balls 14 are used in a circular track 12, without obstruction 15, the balls 14 tend to either travel in a circle about the track 12, they rest in a vibration node on each side of the vibrational axis, or they oscillate about the vibrational node. If two balls 14 and the obstruction 15 are used in conjunction with the circular track 12, the balls 14 tend to either rest in, or oscillate about, a vibration node on opposite sides of the vibrational axis, or the balls 14 will rest against the obstruction 15, without being deflected into the hole 34.

The testing showed that if three balls 14 are used on a track 12 without obstruction 15, the three balls tend to travel in a continuous circle since there is always one ball 14 which cannot rest in a vibrational node. Unless the track 12 is almost flat, the impact among the balls 14, does not dislodge the balls 14 out of the track 12. However, if the obstruction 15 is used in conjunction with three balls 14 riding on the track 12, then one of the balls 14 can be deflected out of the track 12, into the hole 34, and onto the valve seat 36 to shut off the gas flow. The vibrational level at which the ball 14 will be deflected into the hole 34 depends upon the shape of the obstruction 15 and upon the manner in which the ball 14 rests in the track 12.

If the track 12 is made sufficiently wide and deep so that a large portion of the ball 14 rests in the track 12, a large seismic or vibrational force will be required to make the ball 14 leave the track 12. Conversely, as the track 12 approaches a flat surface, less force is required to dislodge the ball 14 out of the track 12.

Referring to FIGS. 5 and 6, obstruction 15 has a curved shape such that the height of the obstruction 15 decreases non-uniformly towards the inside of the circular track 12. The height of the obstruction 15 with respect to the ball 14 will vary the amount of seismic disturbance or vibrational energy required to dislodge the ball 14 from the track 12 and direct the ball 14 into the hole 34.

The recess portion 17 of obstruction 15 adjacent the track 12 can also be configured to vary the amount of seismic disturbance or vibrational force required to dislodge the ball 14. For example, a spherical or cylindrical indentation in obstruction 15 would allow the ball 14 to be slightly captivated within the sides of the indentation so that the obstruction 15 could inhibit the ball 14 from dislodging from the track 12 until a predetermined seismic level occurs.

The curvature on the width of rib portion 21 on obstruction 15, can also be varied to determine the vibration level at which ball 14 enters the hole 34. A large curvature on the width of rib portion 21 would simulate a ramp adjacent the track 12 which could facilitate the ball 14 ramping out of the track 12. A rectangular shaped rib 21 would provide a radially oriented wall theoretically contacting the balls 14 on a tangent to their path of travel. Since a radial force is needed to direct the balls 14 toward hole 34, a large amount of energy would be required to impart a motion to the contacting ball 14, in a (radial) direction along the length of the obstruction 15, as would cause the ball 14 to leave the track 12.

In the illustrated embodiment, the steel balls 14 are 9/16" in diameter and ride in a track 12 which has an outer diameter of approximately 1.5 inches, and a recess approximately ¼" wide and 0.060 inches deep. The rib 21 of obstruction 15 ends adjacent to the edge of hole 34. The edge of hole 34 is located approximately ⅛" from the inner edge of track 12. This configuration has been found to dislodge a ball 14 within five seconds after experiencing a 0.3 g, 2.5 Hz., uniaxial vibration along any of four axes, which axes are spaced 45° apart. The valve did not close when subjected to excitation levels of 0.4 g at 10 Hz, for five seconds, 0.08 g at 2.5 Hz for five seconds, and 0.08 g at 10 Hz for five seconds.

A reset device is also provided in order to remove the ball 14 from contacting the valve seat 36 which stops the gas flow through the valve seat 36. Referring to FIG. 3, there is shown a reset rod 40 which is mounted so as to be axially slidable in the hole 38 of the housing 10. An O-ring (not shown) seals the reset rod 40 in a leak-proof manner in order to prevent the inadvertent escape of gas. One end of reset rod 40 has an inclined surface 42 which contacts the ball 14 in order to push the ball back up to the track 12. The inclined surface 42 urges the ball to roll radially outward against the side of hole 34 so that when the top of the hole is reached, the ball 14 rolls radially outward into the track 12. The reset rod 40 can then be retracted in order to provide a free flow of gas through inlet 14, valve seat 36 and outlet 16. The respective diameters of ball 14 and hole 34 must be such that the ball 14 cannot fall between rod 40 and hole 34, but rather such that the ball 14 slides or wells up the side of hole 34 as the ball 14 is pushed by rod 40.

Referring to FIG. 1, there is shown a pin 44 attached to reset rod 40. The pin 44 can be provided with a wire seal analogous to wire 30 and seal 32, in order to insure that the valve has not been tampered with after installation, and further to indicate whether the valve has been reset after a seismic disturbance. At the bottom of reset rod 40 is know or handle 41. By pushing up on the handle 41, the reset rod 40 can be repositioned so as to unblock the valve seat 36 and reposition the ball 14.

We claim:

1. A seismic actuated shut-off valve having inlet and outlet apertures communicating with opposite sides of a valve seat, comprising:
   a track located above the valve seat;
   at least one ball riding on the track;
   an obstruction causing a ball to leave the track when a seismic disturbance causes a ball to contact the obstruction with sufficient energy, the ball falling onto the valve seat to shut-off fluid flow through the valve, said obstruction comprising an inclined surface extending over the track, the obstruction having a height which decreases across the width of the track in a direction towards an aperture in communication with the valve seat.

2. A shut-off valve as defined in claim 1 wherein there are a plurality of balls.

3. A shut-off valve as defined in claim 1 wherein there are three balls.

4. A seismic actuated shut-off valve having inlet and outlet apertures communicating with opposite sides of a valve seat, comprising:
   a track located above the valve seat;
   at least one ball riding on the track;
   an obstruction causing a ball riding on the track to leave the track when a seismic disturbance causes a ball to contact the obstruction with sufficient energy, the ball falling onto the valve seat to shut-off fluid flow through the valve, said obstruction comprising a recess having a shape which encloses a portion of a contacting ball to inhibit the ball from leaving the track when the seismic disturbance is below a predetermined level.

5. A shut-off valve as defined in claims 1, 2, or 3 or 4, wherein the obstruction comprises:
   an obstruction having a length forming a surface for contacting a ball riding on the track, the surface being formed by the obstruction having a width which varies along the length of the obstruction.

6. A shut-off valve as defined in claims 1, 4, 2, or 3, wherein the obstruction comprises:
   an obstruction having a width forming a surface for contacting a ball riding on the track, the surface being formed by the obstruction having a width which is generally narrower towards the valve seat.

7. A shut-off valve as defined in claims 1, 4, 2, or 3, wherein the obstruction comprises:
   an obstruction having a height forming a surface for contacting a ball riding on the track, the surface being formed by the obstruction having a width which decreases as the height increases.

8. A shut-off valve as defined in claims 1, 4, 2, or 3, wherein the obstruction comprises:
   an obstruction having a length, and further having a height and width which vary along that length, the width being generally narrower toward the valve seat, the width also being generally smaller as the distance from the track increases, and the height generally decreasing toward the valve seat.

9. A shut-off valve as defined in claims 1, 4, 2 or 3, wherein the track is generally circular in shape and has a rectangular cross section sized with respect to a ball riding on the track such that the ball contacts the track at only two points.

10. A seismic actuated shut-off valve having an inlet and outlet in communication with opposite sides of a shut-off valve seat, comprising:
    a valve housing containing the shut-off valve which is in communication with the inlet and outlet;
    track means located in the valve housing above the valve seat;
    a plurality of balls riding on the track means;
    obstruction means for causing a ball to leave the track and contact the valve seat to shut-off the valve when a predetermined seismic level is exerted on the housing, said obstruction means further comprising recess means for inhibiting the ball from leaving the track until a predetermined seismic level is attained.

11. A shut-off valve as defined in claim 10 further comprising:
    reset means for unblocking the valve seat and returning the ball to the track.

12. A shut-off valve as defined in claims 10 or 11 wherein there are at least three balls.

13. A seismic actuated shut-off valve comprising:
    a valve housing comprising an inlet and an outlet communicating with opposite sides of a shut-off valve seat;
    a generally annular track in the valve housing, the track being located above the valve seat;
    at least three balls riding on the track; and
    an aperture adjacent the track and communicating with the valve seat, the aperture shape allowing a ball to move from the track to the valve seat to shut off fluid flow through the valve.

14. A shut-off valve as defined in claim 13 further comprising an obstruction extending across the track and having a height which decreases toward the aperture.

15. A shut-off valve as defined in claim 14, wherein the obstruction further comprises:
    a recess which accommodates a portion of a contacting ball to inhibit the ball from leaving the track when the seismic disturbance is below a predetermined level.

16. A shut-off valve as defined in claim 14, further comprising an obstruction causing a ball to leave the track and contact the valve seat to shut off the fluid flow through the valve when a predetermined seismic level is exerted on the valve.

17. A shut-off valve as defined in claim 13, 14 or 16 wherein the obstruction comprises:
an obstruction having a length forming a surface for contacting at least one of said balls, the surface being formed by the obstruction having a width which varies along the length of the obstruction.

18. A shut-off valve as defined in claim 13, 14 or 16 wherein the obstruction comprises:
an obstruction having a length forming a surface for contacting at least one of said balls, the surface being formed by the obstruction having a width which is generally narrower toward the aperture.

19. A shut-off valve as defined in claim 13, 14 or 16 wherein the obstruction comprises:
an obstruction having a height forming a surface for contacting at least one of said balls, the surface being formed by the obstruction having a width which decreases as the distance away from the track increases.

20. A shut-off valve as defined in claim 13, 14 or 16 wherein the obstruction comprises:
an obstruction having a length, width, and height which form a surface for contacting at least one of said balls, the surface being formed by the obstruction having a height which decreases toward the aperture, and a width which initially decreases as the height increases away from the aperture and then increases with further distance away from the aperture.

21. A shut-off valve as defined in claim 13 or 16 wherein the annular track comprises two concentrically positioned edges spaced such that each ball riding on the track is supported only by said edges.

22. A shut-off valve as defined in claim 13 further comprising an obstruction causing a ball to leave the track and contact the valve seat to shut off fluid flow through the valve when a predetermined seismic level is exerted on the valve.

23. A seismic actuated shut-off valve comprising:
a valve housing comprising an inlet and an outlet communicating with opposite sides of a shut-off valve seat;
a generally annular track in the valve housing, said track being located above the valve seat;
at least one ball riding on said track;
an opening adjacent the track and communicating with the valve seat, said opening being sized to allow a ball riding on the track to move from the track to the valve seat to shut off fluid flow through the valve;
said track comprising two concentrically positioned edges spaced such that the ball riding in the track contacts the edges at only two points on the ball.

* * * * *